Patented Mar. 23, 1943

2,314,571

UNITED STATES PATENT OFFICE 2,314,571

PROCESS FOR PRODUCING GAMMA-HALOGEN GAMMA-ACETO PROPYL ALCOHOL

Edwin R. Buchman, Pasadena, Calif., assignor to Research Corporation, New York, N. Y., a corporation of New York No Drawing. Original application September 27, 1939, Serial No. 296,816. Divided and this application August 21, 1940, Serial No. 353,504

7 Claims. (Cl. 260—594)

This invention relates to the production of halogenated derivatives of aceto propane and has for its object the provision of new and useful derivatives of this nature and useful and effective methods of making them. Halogenated derivatives of the type to which this invention relates are useful in the synthesis of vitamin $B_1$, which has extremely valuable therapeutic and nutritional properties.

This application is a division of my copending application Serial No. 296,816 filed September 27, 1939, for Halogenated derivatives of aceto propane, which in turn was filed as a continuation in part of my applications, Serial No. 118,573, filed December 31, 1936, and Serial No. 171,905, filed October 30, 1937. Application Serial No. 118,573 was a division of application Serial No. 98,929, which I filed September 1, 1936, while application Serial No. 171,905 was a continuation in part of application Serial No. 11,683, which I filed March 18, 1935, and of said application Serial No. 98,929.

In the foregoing applications the product obtained by halogenating $\gamma$ aceto propyl alcohol or by hydrolysing halogenated $\alpha$ aceto $\gamma$ butyrolactone is described as $\gamma$ halogen $\gamma$ aceto propyl alcohol but it has been subsequently found that molecules of a $\gamma$ halogen $\gamma$ aceto propyl alcohol tend to react spontaneously with one another to form halogenated aceto propyl ethers with surprising ease. These ethers when in aqueous solutions hydrolize into the halogenated alcohol more or less completely according to the concentration and temperature. When $\gamma$ halogen $\gamma$ aceto propyl alcohol is distilled, the resulting product may consist predominantly of either the alcohol or the ether depending upon the temperature, pressure and/or speed of the distillation. The conditions for isolation described in the above mentioned applications are such as to produce, in whole or in part, the ether rather than the alcohol.

There are three possible forms in which $\gamma$ aceto propyl alcohol may exist, the formulae of which may be written:

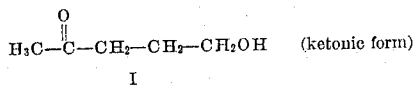 (ketonic form)

I

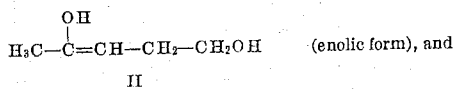 (enolic form), and

II

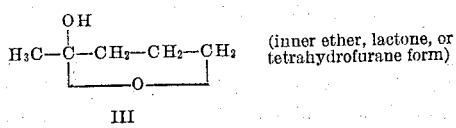 (inner ether, lactone, or tetrahydrofurane form)

III

It is probable that any solution of this product contains some or all of these forms in equilibrium. The above outlined ketonic form undoubtedly is in tautomeric equilibrium with the enolic form of the molecule. These tautomeric forms are, however, so readily interconvertible, in harmony with enol-keto tautomers in general, that for the sake of simplicity the enolic forms will be ignored in the following discussion.

The several halogen derivatives of $\gamma$ aceto propyl alcohol likewise may exist in similar forms having the structures:

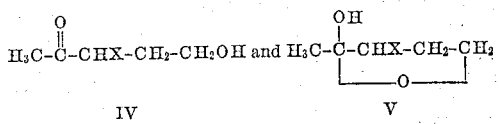

IV          V in which X is one of the halogens chlorine, bromine and iodine.

It is obvious that when two molecules of one of these halogenated aceto propyl alcohols react to form an ether, the resulting ether may have any one of the following structures:

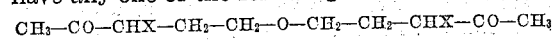

VI

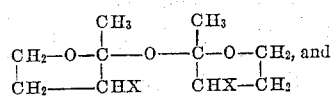

VII

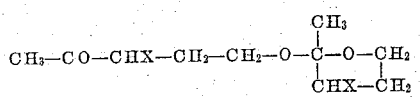

VIII in which formulae, X has the same significance as before. It is difficult to determine which of these forms the ether will assume under any given set of conditions, but it appears that the form usually obtained under ordinary conditions, as in the specific examples given hereinafter, possesses one tetrahydrofurane radical and has the structure indicated by Formula VIII.

In the aforementioned application Serial No. 171,905, I have described several methods of making halogen derivatives of $\gamma$ aceto propyl alcohol and have described the properties of the resulting products. Several products of reaction which boil over the range from 84° to 120° C. at 1 to 2 mm. pressure are described therein and, while halogen derivatives of $\gamma$ aceto propyl alcohol undoubtedly are present in the reaction mixtures obtained by halogenation of $\gamma$ aceto propyl alcohol, one of the above described halogenated ethers is the principal product obtained upon distillation under the conditions described, instead of the corresponding halogenated alcohol as stated in my previous applications referred to hereinabove. However, for all practical purposes, the desired result is obtained no matter which compound is secured because in the presence of traces of water the ether reacts as if the alcohol were used. For example, if the product is dissolved in water, a solution containing halogenated aceto propyl alcohol is obtained. Since the principal intended use of the product is in the synthesis of the thiazole portion of vitamin $B_1$ and in such synthesis water is present or is formed in the course of the reaction, the particular product isolated is more or less immaterial except from a theoretical standpoint. Because the ether is more stable than the alcohol, it is preferable from a practical standpoint to employ the ether.

In accordance with the present invention, a halogenated derivative of aceto propane may be prepared by the halogenation of $\gamma$ aceto propyl alcohol with one of the elemental halogens bromine, chlorine and iodine or with sulphuryl bromide or sulphuryl chloride. The same halogenated derivative may likewise be made by halogenating $\alpha$ aceto $\gamma$ butyrolactone with one of the same halogenating agents and then subjecting the resulting $\gamma$ halogenated butyrolactone to a combined hydrolysis and decarboxylation. The reaction product is then treated in a suitable manner to remove the desired product, or products, which may be a halogen derivative of $\gamma$ aceto propyl alcohol, a halogen derivative of aceto propyl ether, or both, depending upon the isolation process.

The invention will be fully understood from the following detailed description of specific embodiments thereof. As an example of how the invention may be practiced, $\gamma$ aceto propyl alcohol may be halogenated by treatment with a suitable halogenating agent, such as a halogen or a sulfuryl halide.

*Example 1*

In accordance with one specific embodiment of the invention, $\gamma$ brom $\gamma$ aceto propyl alcohol, which may also be designated 3-brom-3-aceto-propan-1-ol, may be prepared by dissolving 30 grams of $\gamma$ aceto propyl alcohol in 150 cc. of water and vigorously stirring the solution while 48 grams of bromine are added drop by drop at such a rate that the color imparted to the solution by one drop of the bromine disappears before the next drop is added. The aqueous solution which results contains impure $\gamma$ brom $\gamma$ aceto propyl alcohol.

One method of purifying the product is to separate the small amount of insoluble oil which is formed as a by-product, from the aqueous solution and to extract the aqueous solution repeatedly with ordinary ethyl ether to dissolve the remainder of the brominated product. The insoluble oil and the ethereal extracts are combined and dried over a suitable dehydrating agent such as anhydrous sodium sulfate. The ethyl ether is then distilled off and the residue is practically pure di (brom aceto propyl) ether which is hereinafter designated brom aceto propyl ether. This material may be further purified, if desired, by distilling it in vacuo at less than 1 mm. of mercury. The product is a colorless oil, which is soluble in hot water, ether and alcohol and which may be distilled though not without some decomposition. The pure substance can be readily distilled in a molecular still at 40° C. bath temperature and at 0.008 mm. pressure. Calc'd. for: $C_{10}H_{16}O_3Br_2$. mol. wt.$=343.96$; $C=34.89$; $H=4.69$. Found: mol. wt.$=316$ (dioxane); $C=34.84$; $H=4.56$. $d^{25°}=1.592$ gm./cc. $n^{25°}{}_D=1.4989$.

The brom aceto propyl ether thus prepared is sparingly soluble in water but freely soluble in organic solvents such as petroleum ether. It may be converted into $\gamma$ brom $\gamma$ aceto propyl alcohol by making a dilute water solution thereof, for it hydrolizes readily into the brominated alcohol. The solution of the ether in water may be most readily effected by mild heating at a temperature of 50° to 60° C. The brom alcohol has not been isolated as such because it goes over into the ether too readily. However, the presence of the alcohol in a water solution of the brom ether has been established by freezing point depression of the aqueous solution.

*Example 2*

The corresponding chlorine derivatives may likewise be made by direct reaction of chlorine upon $\gamma$ aceto propyl alcohol. This reaction may be carried out by treating 12 grams of $\gamma$ aceto propyl alcohol, dissolved in 60 cc. of water, with a stream of gaseous chlorine, the reaction mixture being stirred and cooled if necessary so that the temperature remains between 20° C. and 40° C. This is continued until the increase in weight of the reaction mixture reaches 8½ grams. The mixture is cooled to about 15° C. and allowed to stand 15 minutes during which time a small, heavy oily layer separates at the bottom of the vessel. This oily layer is removed and washed twice with water. The aqueous layer and the aqueous washings are extracted with ethyl ether. Then the ethereal extracts are combined with the above oily layer and dried over a suitable dehydrating agent, such as sodium sulfate. The ethyl ether is evaporated off leaving an oil boiling at 87° to 110° C. at about 2 mm. pressure. This material is a stable, colorless oil which is soluble in ether, alcohol and hot water and is slightly soluble in cold water. This product consists principally of chlor aceto propyl ether having the properties described in Example 5 below.

The invention also contemplates the production of the related iodine derivatives in a similar manner, although iodine is not so reactive as bromine or chlorine and the yield of the iodine compounds is not so great.

Instead of using halogens as the halogenating agents, sulfuryl halides, such as sulfuryl chloride or sulfuryl bromide may be employed.

*Example 3*

In practicing one process of this nature, 27 grams of sulfuryl chloride are added slowly to 20.4 grams of $\gamma$ aceto propyl alcohol and the reaction mixture is kept at 0° C. for one-half hour. At the end of that time, 50 cc. of ethyl ether are added and the mixture is heated to expel the sulfur dioxide and the hydrogen chloride remaining in the mixture. The mixture is then cooled and poured onto crushed ice and the excess acidity is neutralized with a potassium carbonate solution. The resulting mixture is repeatedly extracted with petroleum ether and the ether extract is treated first with anhydrous sodium sulfate and finally with anhydrous potassium carbonate. After the extract is dried, the residue is distilled in vacuo to remove the petroleum ether and the residue is fractionally distilled in vacuo, whereupon a product having a boiling point at 2 mm. pressure of about 90° to 120° C. is obtained.

This product also consists predominately of the aforementioned chlor aceto propyl ether.

The corresponding brom compounds may be prepared in a similar manner by reacting upon γ aceto propyl alcohol with an equivalent amount of sulfuryl bromide and purifying the product obtained by a similar procedure.

The brom, chlor and iodo derivatives of aceto propane described hereinbefore may also be made by simultaneously hydrolizing and decarboxylating the corresponding α halogen dervative of α aceto γ butyrolactone. The α aceto γ butyrolactone employed in this reaction has the formula

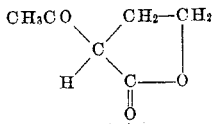

and may be prepared in accordance with the method described in the article by I. L. Knunyants, G. V. Chelintzev and E. D. Osetrova, published in Compt. Rend. Acad. Sci. U. S. S. R. n. s. 1, 315–317 (1934) and referred to in Chemical Abstracts 28, 4382 (1934). This reaction is carried out by causing ethyl aceto acetate to react with ethylene oxide in the presence of either sodium ethylate or sodium methylate, the latter being preferred.

*Example 4*

Chlor aceto propyl ether may be obtained by first preparing α chlor α aceto γ butyrolactone by treating α aceto γ butyrolactone with sulfuryl chloride, in accordance with the method described in my aforesaid application Serial No. 118,573, now Patent No. 2,193,858, issued March 19, 1940.

In carrying out this reaction 68 grams of the α aceto γ butyrolactone are placed in a flask equipped with a mechanical stirrer and 68 grams of sulfuryl chloride are added with continual stirring over a period of one and a half hours. After the reaction is completed the reaction product is washed with water, taken up in ether and dried over a suitable dehydrating agent, such as calcium chloride. The ethereal extract is then distilled at a reduced pressure and the fraction distilling at approximately 85° C. and 2 or 3 mm. pressure is collected. This product is substantially pure α chlor α aceto γ butyrolactone having the formula:

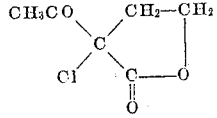

81 grams of this chlor lactone, 80 cc. of water and 15 cc. of concentrated hydrochloric acid are then mixed and heated under a reflux condenser at 100° C. for 75 minutes. By this treatment the chlor butyrolactone is simultaneously hydrolyzed and decarboxylated in accordance with the following equation:

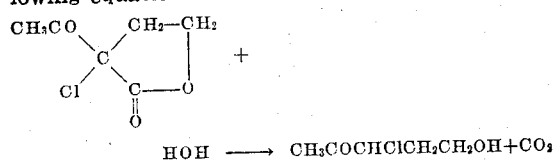

A similar result is obtained by using a dilute solution of an alkali instead of the dilute acid. The acid and alkali are both examples of pH modifying agents.

The reaction mixture is then extracted several times with small portions of ethyl ether and the combined ethereal solution is dried over a dehydrating material, such as sodium sulphate. The dried solution is then distilled in vacuo and the portion boiling at 85° to 110° C. at 2 to 3 mm. pressure is collected. The collected material is principally chlor aceto propyl ether and is substantially identical with the product obtained by direct chlorination of γ aceto propyl alcohol and distillation of the reaction product as described in Example 2.

*Example 5*

410 grams of the chlorinated lactone prepared as described in Example 4 are heated on a steam bath with 410 cc. of water and 12 cc. of 38% hydrochloric acid until decarboxylation is complete. This operation requires about 7 hours. On cooling the reaction mixture an oily layer separates which is removed by repeated extraction of the mixture with petroleum ether. The ether extracts are then shaken with solid potassium carbonate to remove any acid, the potassium carbonate is filtered off, the solvent is removed by means of a water pump and the remaining oil is fractionally distilled. The fraction boiling at 68° C. to 120° C. at a pressure of 1 mm. is collected and upon redistillation of this fraction pure chlor aceto propyl ether is obtained from the distillate boiling at 110° to 112° at 1 mm. pressure. Calc'd for $C_{10}H_{16}O_3Cl_2$: mol. wt.=255.06; C=47.04; H=6.32 and Cl=27.81. Found: mol. wt. 259 (dioxane); C=47.13; H=6.13; and Cl=28.07. $d^{25°}=1.2175$ gm./cc. $n^{25°}_D=1.4748$. This chlor aceto propyl ether is a colorless and almost odorless liquid which is soluble with difficulty in water but which is readily soluble in organic solvents.

*Example 6*

If the oily liquid described in Example 5 is fractionally distilled at 1.7 mm. pressure and that fraction which is obtained at 68° to 70° C. is redistilled at $3\times10^{-3}$ mm. at 20° to 24° C., a fraction is obtained consisting of γ chlor γ aceto propyl alcohol. Calc'd for $C_5H_9O_2Cl$; mol. wt.= 136.54; C=43.95; H=6.64; and Cl=25.96. Found: mol. wt.=146 (dioxane); C=44.64; H=6.29 and Cl=26.43. $d^{25°}=1.210$ gm./cc. $n^{25°}_D=1.4684$. This chlor aceto propyl alcohol is insoluble in petroleum ether, whereas the chlor aceto propyl ether is soluble therein.

If, however, this low boiling fraction is redistilled at 1.7 mm. pressure, most of the distillate boils in the ether range, that is about 120° C. with splitting off of water, which can be collected in a carbon dioxide trap. Thus, it is evident that both chlor aceto propyl alcohol and chlor aceto propyl ether may be obtained from the same reaction mixture and that the product isolated depends upon the conditions which exist during the isolation step.

Aqueous solutions of chlor aceto propyl ether give molecular weight values indicating complete hydrolysis into chlor aceto propyl alcohol. The ether goes into water solution readily when the mixtures are warmed. 60° C. having proved to be a satisfactory temperature to employ.

*Example 7*

5 grams of chlor aceto propyl ether, prepared by any of the foregoing processes are heated with 500 cc. of water at 60° C. for about six hours and the mixture is allowed to stand. All of the resulting oily layer will dissolve upon shaking the mixture. The mixture is extracted repeated with ether, the ethereal extracts are dried over a suitable dehydrating agent, such as sodium sulfate, and the solvent is then removed in a water pump at 200° C. The residual oil is then fractionally distilled in a molecular still and γ chlor γ aceto propyl alcohol, boiling at 27° C. at 0.01 mm. pressure is obtained. Calc'd for $C_5H_9O_2Cl$: mol. wt.=136.54; C=43.95; H=6.64 and Cl=25.97. Found: apparent mol. wt.=118.5; corrected for ½ mol. of water consumed in the hydrolysis would give mol. wt.=127.5; C=44.35; H=6.48. $d^{25°}=1.210$ gm./cc. $n^{25°}{}_D=1.4684$. The chlor aceto propyl alcohol is insoluble in petroleum ether, while chlor aceto propyl ether dissolves therein readily.

The bromine compound which corresponds to the chlorinated lactone described hereinabove in Example 4 may be made in an analogous manner by treating α aceto γ butyrolactone with sulphuryl bromide or in aqueous suspension with bromine. The bromide compound corresponding to the above described chlorinated aceto propyl alcohol may then be prepared by treating the brominated lactone with a suitable pH regulating agent, such as dilute hydrobromic acid.

*Example 8*

These reactions may be carried out by suspending 32 grams of α aceto γ butyrolactone in 70 cc. of water and adding 40 grams of bromine thereto drop by drop, meanwhile vigorously stirring the mixture with a mechanical stirrer. This will produce α bromo α aceto γ butyrolactone and in the reaction which occurs hydrobromic acid is also produced. This brominated lactone may be hydrolyzed and decarboxylated by means of a dilute solution of hydrobromic acid. Since hydrobromic acid is present in the reaction mixture resulting from the bromination of the lactone, the simplest way to hydrolyze the brominated lactone is to continue to stir the mixture after the bromine has been added, until the hydrolysis and decarboxylation are completed. The brominated product resulting from the hydrolysis is extracted from the mixture with ether, and the ethereal extract is dried. The dried extract is freed from ethyl ether and is then distilled in vacuo at about 1 mm. pressure and the brom aceto propyl ether is collected. This material is an oil which is colorless when freshly made, but it is not as stable as the corresponding chlorine compound and darkens on standing.

The corresponding γ iodo γ aceto propyl alcohol and iodo aceto propyl ether may be produced in smaller yields than the related chlor and brom compounds by employing elemental iodine instead of the chlorinating and brominating agents mentioned previously in the several reactions described hereinabove. If desired, the iodo compounds may also be prepared in more substantial yields, by treating one of the chlor or brom alcohols or ethers with sodium iodine.

As stated previously, the halogenated aceto propyl ethers obtained may assume the structures indicated by Formulae VI, VII, and VIII outlined hereinabove. If VI were the correct structure, one would expect that two molecules of phenyl hydrazine would react with 1 molecule of the dihalo-aceto-propyl ether. If the correct structure were VII phenyl hydrazine would not react with this ether at all. Actually, in full agreement with structure VIII, only 1 molecule of phenyl hydrazine reacts with 1 molecule of the ether. When a second molecule of phenyl hydrazine is present, it separates from the reaction mixture as phenyl hydrazine hydrochloride. The product of reaction of phenyl hydrazine with γ halogen γ aceto propyl ether is analogous in structure to "tetraphenyltetracarbazon" described by Sven Bodforss in Berichte der deutschen chemischen Gesellschaft, vol. 52, p. 1762 and 1767 (1919) and vol. 72, p. 468 (1939). The reaction involved is also analogous to that of Bodforss but only one side of the molecule undergoes reaction with phenyl hydrazine. Thus the product of the action of phenyl hydrazine on γ chloro γ aceto propyl ether having the properties described in Example 5 is a yellowish crystalline powder melting at about 85° C., insoluble in water or petroleum ether, but soluble in other usual organic solvents, such as alcohol, acetone or ether. It has a composition corresponding to the formula

According to the later ideas of Bodforss, its structure is as follows:

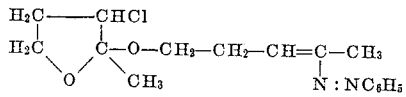

If an excess of phenyl hydrazine is used in the above reaction and an inert solvent is employed, the excess of the reagent is unchanged showing the presence of one and only one α chlor keto group in the molecule of the γ chloro γ aceto propyl ether. This is further confirmed by the action of iodine on an aqueous alkaline solution of γ chloro γ aceto propyl ether. If this reaction is carried out with a cold water solution only half as much iodine is consumed as is the case when the γ chloro γ aceto propyl ether is first warmed with water for a few minutes before carrying out the iodine reaction. This is evidence that the ether has only one —$COCH_3$ group and that another such group is formed when the ether is hydrolyzed into the related alcohol.

From the foregoing, it is apparent that the halogenated aceto propyl ethers produced as described hereinbefore contain at least one tetrahydrofurane group and that in all probability they contain only one such group. However, the appended claims are intended to embrace all forms of the ether unless specifically limited to cover only certain ones of such ethers.

The chlorine, bromine and iodine derivatives of γ aceto propyl alcohol and ether produced in accordance with the invention may be condensed with thio formamide to produce salts of the thiazole derivative known as 4-methyl-5-(β-hydroxy-ethyl) thiazole in accordance with the method outlined in Patent No. 2,133,966 granted October 25, 1938. This thiazole derivative may in turn be caused to enter into other reactions to produce synthetic compounds having the characteristic physiological and therapeutic properties of the antineuritic vitamin.

What is claimed is:

1. Process of producing a γ halogen γ aceto propyl alcohol which comprises treating a di-γ halogen γ aceto propyl ether with water.

2. Process of producing γ brom γ aceto propyl alcohol which comprises treating a di- γ brom γ aceto propyl ether with water.

3. Process of producing γ chlor γ aceto propyl alcohol which comprises treating a di- γ chlor γ aceto propyl ether with water.

4. Process of producing γ iodo γ aceto propyl alcohol which comprises treating a di- γ iodo γ aceto propyl ether with water.

5. The process of producing a γ halogen γ aceto propyl alcohol which comprises heating a di- γ halogen γ aceto propyl ether with water.

6. The process of producing a γ halogen γ aceto propyl alcohol which comprises heating a di- γ halogen γ aceto propyl ether with water at a temperature above room temperature.

7. The process of producing a γ halogen γ aceto propyl alcohol which comprises heating a di- γ halogen γ aceto propyl ether with water at a temperature of about 50° C. to 60° C.

EDWIN R. BUCHMAN.